US012644052B2

(12) United States Patent
Ueda et al.

(10) Patent No.: US 12,644,052 B2
(45) Date of Patent: Jun. 2, 2026

(54) PROCESSING APPARATUS AND PROCESSING METHOD

(71) Applicant: THE JAPAN STEEL WORKS, LTD., Tokyo (JP)

(72) Inventors: Naoki Ueda, Tokyo (JP); Satoru Nakamura, Tokyo (JP); Kenichi Furuki, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 231 days.

(21) Appl. No.: 18/576,736

(22) PCT Filed: Jul. 26, 2022

(86) PCT No.: PCT/JP2022/028705
§ 371 (c)(1),
(2) Date: Jan. 4, 2024

(87) PCT Pub. No.: WO2023/053695
PCT Pub. Date: Apr. 6, 2023

(65) Prior Publication Data
US 2024/0287388 A1     Aug. 29, 2024

(30) Foreign Application Priority Data

Sep. 28, 2021     (JP) ................................. 2021-157968

(51) Int. Cl.
*C10B 7/10*          (2006.01)
*B29B 17/02*         (2006.01)
(Continued)

(52) U.S. Cl.
CPC ............... *C10B 7/10* (2013.01); *B29B 17/02* (2013.01); *B65G 33/18* (2013.01); *B65G 33/265* (2013.01);
(Continued)

(58) Field of Classification Search
CPC .. C10B 5/00; C10B 7/10; C10B 33/06; C10B 53/07
See application file for complete search history.

(56) References Cited

U.S. PATENT DOCUMENTS 4,084,521 A * 4/1978 Herbold .................. C10B 53/00
                                                           201/35
4,098,649 A * 7/1978 Redker ..................... C10B 7/10
                                                           201/2.5
(Continued)

FOREIGN PATENT DOCUMENTS

DE        3305161 A1    8/1984
EP        2998383 A1    3/2016
(Continued)

OTHER PUBLICATIONS

Extended European Search Report and European Search Opinion issued Aug. 27, 2025, in European Patent Application No. 22875572.4.

(Continued)

*Primary Examiner* — Jonathan Miller
(74) *Attorney, Agent, or Firm* — Potomac Law Group, PLLC

(57) ABSTRACT

In a processing apparatus, a processing furnace includes a supply port configured to receive a processing target and a discharge port configured to discharge a residue. A temperature control region controls a temperature of an intermediate part between the supply port and the discharge port. A screw rotates to be able to convey the processing target supplied from the supply port toward the discharge port. A first decomposition region includes a first recovery port configured to recover a first fluid obtained by decomposing the processing target in a predetermined region in the intermediate part from the processing furnace. A second decomposition region includes a second recovery port configured to (Continued)

recover, from the processing furnace, a second fluid obtained by decomposing the processing target on the downstream side of the first decomposition region.

12 Claims, 12 Drawing Sheets

(51) Int. Cl.

| | |
|---|---|
| *B65G 33/18* | (2006.01) |
| *B65G 33/26* | (2006.01) |
| *C08J 11/12* | (2006.01) |
| *C10B 5/00* | (2006.01) |
| *C10B 33/06* | (2006.01) |
| *C10B 53/07* | (2006.01) |
| *F27B 9/24* | (2006.01) |
| *F27B 9/40* | (2006.01) |

(52) U.S. Cl.

CPC ................. *C08J 11/12* (2013.01); *C10B 5/00* (2013.01); *C10B 33/06* (2013.01); *C10B 53/07* (2013.01); *F27B 9/24* (2013.01); *F27B 9/40* (2013.01); *B29B 2017/0255* (2013.01); *F27B 2009/2484* (2013.01)

(56) References Cited

U.S. PATENT DOCUMENTS

| | | | | |
|---|---|---|---|---|
| 4,123,332 A | * | 10/1978 | Rotter | C10B 7/10 |
| | | | | 202/137 |
| 4,479,048 A | * | 10/1984 | Kinoshita | B29C 48/832 |
| | | | | 219/421 |
| 4,618,735 A | * | 10/1986 | Bridle | C02F 11/10 |
| | | | | 201/2.5 |
| 6,346,220 B1 | | 2/2002 | Kosugi et al. | |
| 7,727,377 B2 | * | 6/2010 | Pickler | C10B 53/07 |
| | | | | 422/204 |
| 8,328,993 B2 | * | 12/2012 | Feerer | F23G 5/0273 |
| | | | | 202/229 |
| 8,574,325 B2 | * | 11/2013 | Jensen | C10J 3/32 |
| | | | | 422/186.21 |
| 9,663,662 B1 | * | 5/2017 | Khusidman | C10B 47/44 |
| 9,724,844 B1 | * | 8/2017 | Kowalczyk | B29B 7/488 |
| 10,421,911 B2 | * | 9/2019 | Ullom | C10B 47/30 |
| 10,731,081 B2 | * | 8/2020 | Ullom | C10B 53/07 |
| 11,168,259 B2 | * | 11/2021 | Drennan | C10B 57/16 |
| 2006/0280669 A1 | * | 12/2006 | Jones | C10B 53/02 |
| | | | | 202/136 |
| 2008/0200737 A1 | | 8/2008 | Pecci | |
| 2013/0256113 A1 | * | 10/2013 | Tumiatti | C10B 49/14 |
| | | | | 422/187 |
| 2013/0299333 A1 | * | 11/2013 | Tucker | C10B 47/44 |
| | | | | 202/113 |
| 2016/0017232 A1 | * | 1/2016 | Ullom | C10G 1/02 |
| | | | | 202/117 |
| 2016/0024390 A1 | * | 1/2016 | Ullom | C10G 1/086 |
| | | | | 202/99 |
| 2019/0300794 A1 | * | 10/2019 | Drennan | C10B 57/14 |
| 2023/0227730 A1 | * | 7/2023 | Pelz | C10B 47/44 |
| | | | | 423/449.7 |

FOREIGN PATENT DOCUMENTS

| | | | |
|---|---|---|---|
| EP | 4112545 A1 | 1/2023 | |
| JP | S49-102073 U | 9/1974 | |
| JP | S58-136315 U | 9/1983 | |
| JP | H06-23747 A | 2/1994 | |
| JP | H10-217245 A | 8/1998 | |
| JP | H11-105031 A | 4/1999 | |
| JP | 2002-120223 A | 4/2002 | |
| JP | 2002-212570 A | 7/2002 | |
| JP | 2002-317072 A | 10/2002 | |
| JP | 2008-545022 A | 12/2008 | |
| JP | 2015-512965 A | 4/2015 | |
| JP | 2015-512972 A | 4/2015 | |
| WO | 2021/172077 A1 | 9/2021 | |

OTHER PUBLICATIONS

Office Action issued Oct. 4, 2022, in Japanese Patent Application No. 2021-157968.

Decision of Refusal issued Mar. 22, 2023, in Japanese Patent Application No. 2021-157968.

Decision to Grant a Patent issued Aug. 8, 2023, in Japanese Patent Application No. 2021-157968.

International Search Report issued Oct. 11, 2022, in International Patent Application No. PCT/JP2022/028705.

* cited by examiner

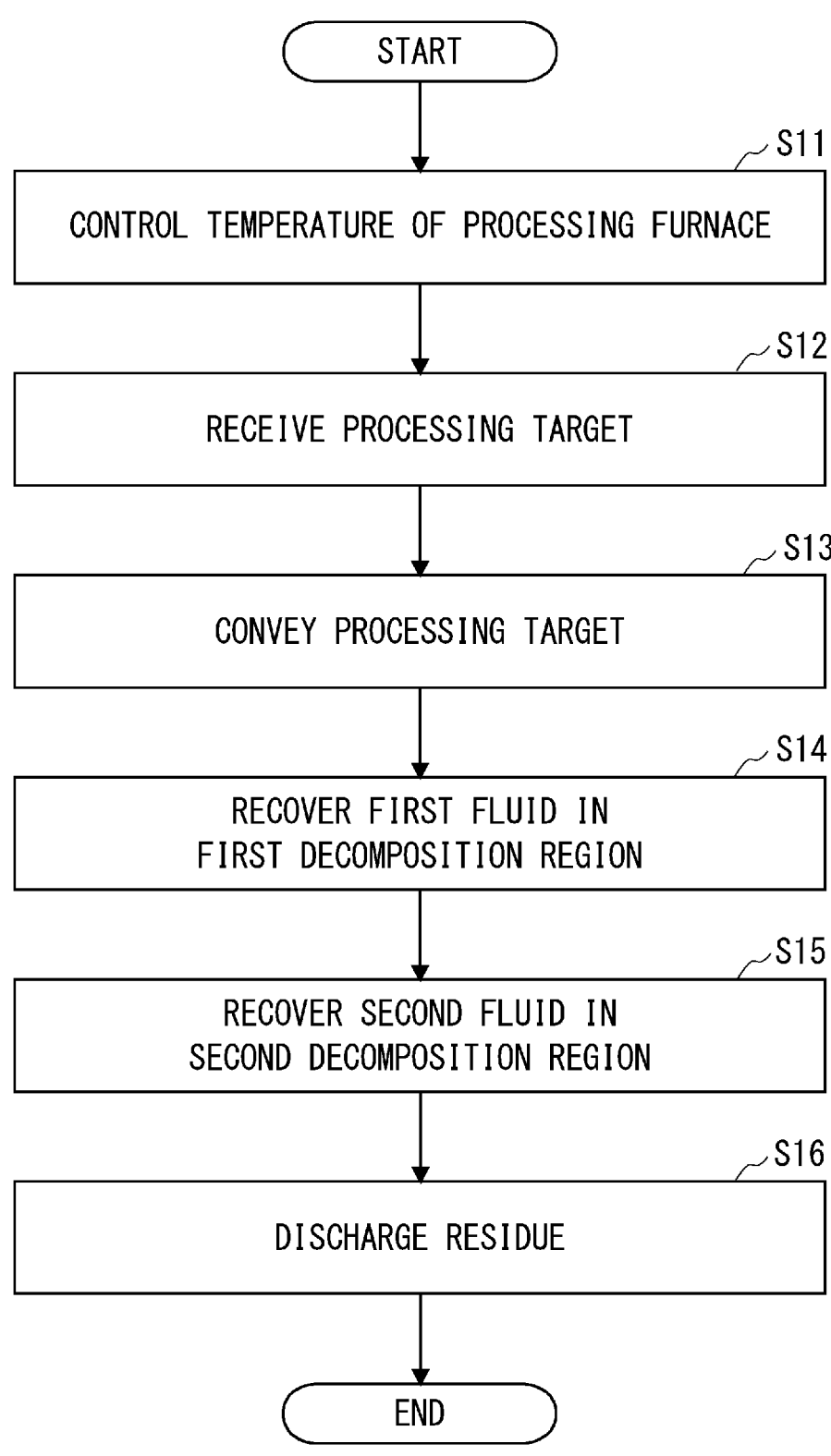
F i g.  3

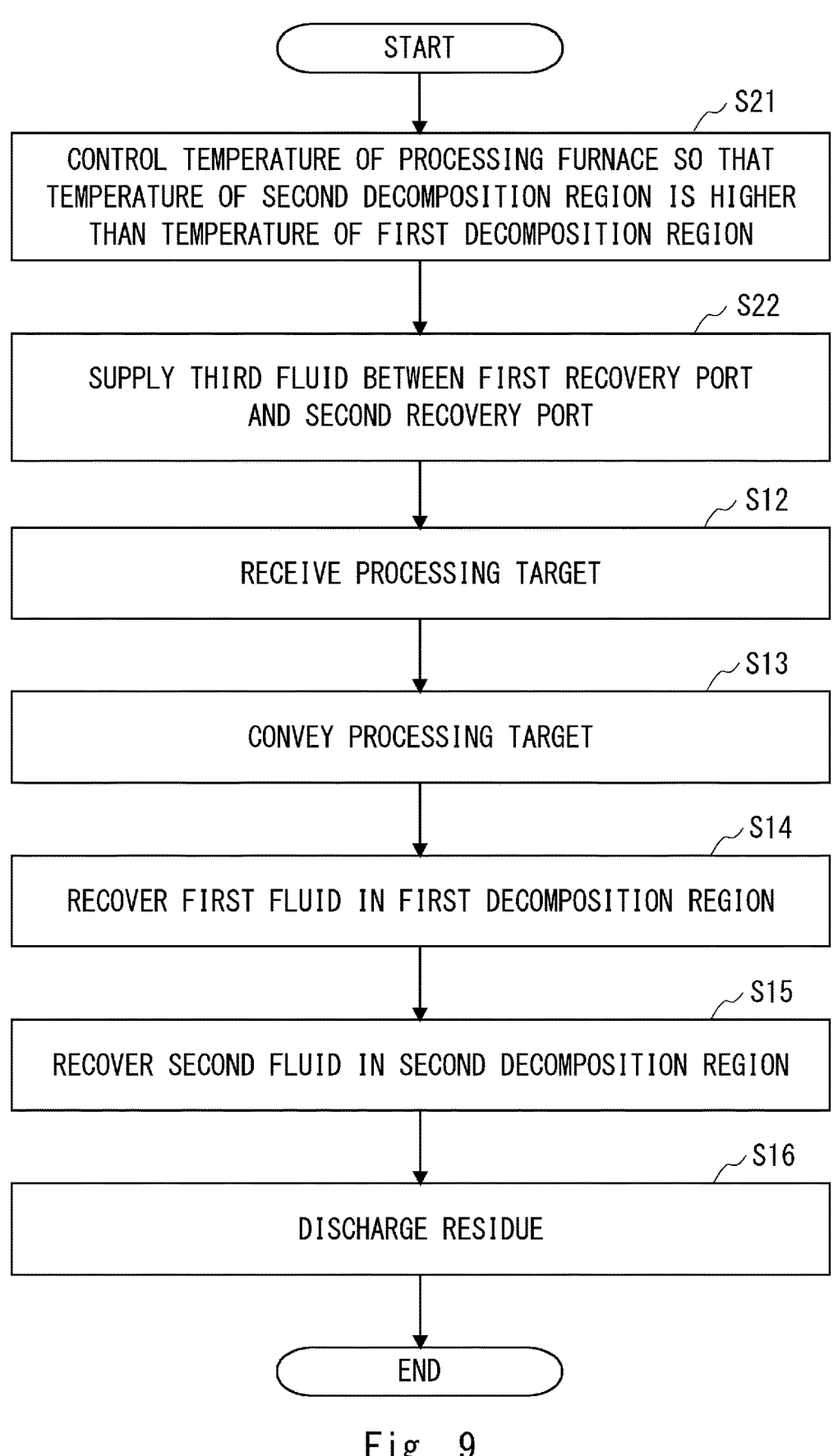

START

S21
CONTROL TEMPERATURE OF PROCESSING FURNACE SO THAT TEMPERATURE OF SECOND DECOMPOSITION REGION IS HIGHER THAN TEMPERATURE OF FIRST DECOMPOSITION REGION

S22
SUPPLY THIRD FLUID BETWEEN FIRST RECOVERY PORT AND SECOND RECOVERY PORT

S12
RECEIVE PROCESSING TARGET

S13
CONVEY PROCESSING TARGET

S14
RECOVER FIRST FLUID IN FIRST DECOMPOSITION REGION

S15
RECOVER SECOND FLUID IN SECOND DECOMPOSITION REGION

S16
DISCHARGE RESIDUE

END

Fig. 9

PROCESSING APPARATUS AND PROCESSING METHOD

TECHNICAL FIELD

The present disclosure relates to a processing apparatus and a processing method.

BACKGROUND ART

The development of recycling technology is becoming active toward a recycling-based society. For example, there is a method called chemical recycling for decomposing waste plastics and taking out valuable materials.

For example, the processing apparatus described in Patent Literature 1 heats waste plastics, thermally decomposes chlorine-based polymers to generate chlorine compounds, and separates them into molten waste plastics and chlorine compounds.

CITATION LIST

Patent Literature

Patent Literature 1: Japanese Unexamined Patent Application Publication No. 2002-317072

SUMMARY OF INVENTION

Technical Problem

By the way, there are a plurality of steps for decomposing waste plastics. In addition, there are individual apparatuses for each of these steps. However, the above-mentioned apparatus is only responsible for some of these steps. Therefore, a system for decomposing waste plastics requires the use of a plurality of apparatuses and thus may become complicated.

The present disclosure has been made to solve such a problem, and provides a processing apparatus and so on for efficiently decomposing waste plastics.

Solution to Problem

A processing apparatus according to the present disclosure includes a processing furnace, a temperature control region, a screw, a first decomposition region, and a second decomposition region. The processing furnace is cylindrical and includes a supply port configured to receive a processing target on an upstream side and a discharge port configured to discharge a residue on a downstream side. The temperature control region includes a heating apparatus or a cooling apparatus configured to control a temperature of the processing furnace at a predetermined position in an intermediate part between the supply port and the discharge port. The screw extends from the upstream side of the processing furnace to the downstream side thereof configured to be able to convey the processing target supplied from the supply port toward the discharge port by rotating. The first decomposition region includes a first recovery port configured to take out a first fluid separated from the processing target in a predetermined region in the intermediate part to outside of the processing furnace. The second decomposition region includes a second recovery port configured to take out a second fluid separated from the processing target to the outside of the processing furnace, the second decomposition region being positioned on the downstream side of the first decomposition region, and the second fluid being different from the first fluid.

In a processing method according to the present disclosure, a processing apparatus executes the following method. The processing apparatus receives a processing target to a cylindrical processing furnace including a supply port configured to receive the processing target on an upstream side and a discharge port configured to discharge a residue on a downstream side. The processing apparatus conveys the processing target toward the discharge port by a screw extending from the upstream side of the processing furnace to the downstream side thereof. The processing apparatus controls a temperature of the processing furnace at a predetermined position in an intermediate part between the supply port and the discharge port. The processing apparatus takes out, from the processing furnace, a first fluid separated from the processing target in a first decomposition region provided in the intermediate part. The processing apparatus takes out, from the processing furnace, a second fluid separated from the processing target in a second decomposition region, the second decomposition region being positioned on the downstream side of the first decomposition region, and the second fluid being different from the first fluid. The processing apparatus discharges the residue passed through the second decomposition region from the discharge port.

Advantageous Effects of Invention

According to the present disclosure, it is possible to provide a processing apparatus for efficiently decomposing waste plastics.

BRIEF DESCRIPTION OF DRAWINGS

FIG. 3 is a flowchart of the processing apparatus according to the first embodiment;

FIG. 9 is a flowchart of the processing apparatus according to the second embodiment;

DESCRIPTION OF EMBODIMENTS

Hereinafter, the present disclosure will be described through embodiments of the disclosure, but the disclosure set forth in claims is not limited to the following embodiments. Furthermore, not all of the configurations described in the embodiments are essential as means for solving problems. For clarity, the following descriptions and drawings have been omitted and simplified as appropriate. In each drawing, the same elements have the same reference signs, and repeated descriptions have been omitted as necessary.

First Embodiment

Figure 1:
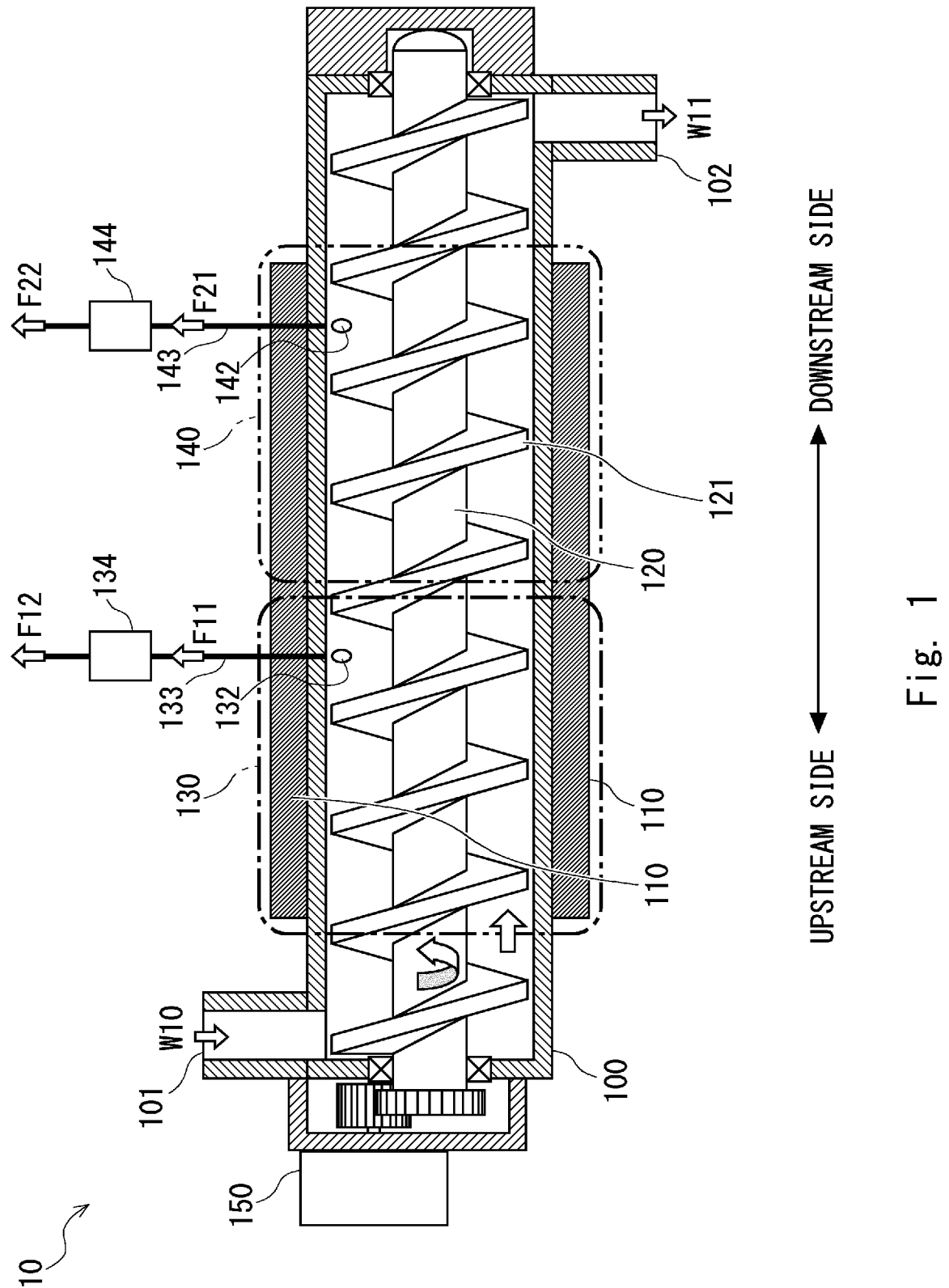
FIG. 1 is a side view of a processing apparatus according to a first embodiment.

Referring to FIG. 1, main components of a processing apparatus according to a first embodiment will be described. FIG. 1 is a side view of a processing apparatus 10 according to the first embodiment. The processing apparatus 10 shown in FIG. 1 is partially cut for clarity.

The processing apparatus 10 is, for example, an apparatus for decomposing waste plastics to the molecular level and recovering various substances as valuable materials. Valuable materials can include not only resins but also methanol, ammonia, hydrocarbons, and so on. These substances recovered by the processing apparatus 10 are reused as gas, oil, or chemical raw materials. In other words, the processing apparatus 10 can be referred to as an apparatus for carrying out so-called chemical recycling. The processing apparatus 10 according to this embodiment has a processing furnace 100, a temperature control region 110, a screw 120, a first decomposition region 130, and a second decomposition region 140 as main components.

The processing furnace 100 is a cylindrical furnace having a supply port 101 on the upstream side for receiving a processing target and a discharge port 102 on the downstream side for discharging a residue. In the processing furnace 100 shown in FIG. 1, the left side is the upstream side and the right side is the downstream side. The processing furnace 100 has an intermediate part between the supply port 101 and the discharge port 102. The processing furnace 100 is formed of a material that allows temperature changes that occur when processing the processing target in the furnace and contact with materials supplied in the furnace and materials generated by reactions or decomposition occurring in the furnace. For example, the processing furnace 100 may be formed of an alloy made mainly of nickel or chromium or a ceramic containing alumina.

The processing apparatus 10 shown in FIG. 1 is oriented horizontally and has the supply port 101 at the upper left end and the discharge port 102 at the lower right end. The processing furnace 100 shown in FIG. 1 receives a processing target W10 from the supply port 101. The processing apparatus 10 rotates the screw 120 provided inside the processing furnace 100 to propel the processing target W10 received by the processing furnace 100 toward the discharge port 102. That is, the processing target W10 supplied to the processing furnace 100 passes through the intermediate part and moves toward the downstream side where the discharge port 102 is provided. The processing apparatus 10 decomposes the processing target W10 by passing the processing target W10 through the intermediate part of the processing furnace 100 to obtain a predetermined decomposition product. The processing furnace 100 then discharges a residue W11 from which the predetermined decomposition product has been removed from the discharge port 102.

The temperature control region 110 includes a temperature control apparatus, i.e., a heating apparatus or a cooling apparatus, to control the temperature of the processing furnace 100 at a predetermined position in the intermediate part between the supply port 101 and the discharge port 102. The temperature control region 110 shown in FIG. 1 has a heating apparatus at the intermediate part of the processing furnace 100 to surround the cylindrical processing furnace 100. The heating apparatus includes any heater capable of temperature control such as, for example, a sheath heater, a coil heater, or a ceramic heater. The heating apparatus performs heating in a range of, for example, normal temperature to about 900 degrees Celsius. The temperature control region 110 can set different temperatures along the axial direction of the screw 120 for each region of the intermediate part of the processing furnace 100, which will be described later. For example, the temperature control region 110 can control the temperature change applied to the processing target W10 in the first decomposition region 130 and the second decomposition region 140, which will be described later.

The temperature control region 110 can also include a control apparatus for controlling the heating apparatus or the cooling apparatus. For example, the temperature control region 110 may include a thermometer for monitoring the temperature at a predetermined position in the processing furnace 100. The processing furnace 100 may also control the temperature, for example, by monitoring a current value if the heating apparatus has a principle of heating by passing a current.

The temperature control region 110 may be configured to perform heating or cooling, for example, by circulating water or oil. The temperature control region 110 may be configured to perform cooling, for example, by using a Peltier element. With the above configuration, the temperature control region 110 can set various temperature distributions along the axial direction of the screw 120 in the processing furnace 100.

The screw 120 is extended from the upstream side to the downstream side of the processing furnace 100 and can convey the processing target W10 supplied from the supply port 101 toward the discharge port 102 by rotating. For example, the screw 120 may be formed of an alloy containing at least one of nickel, cobalt, chromium, iron, copper, aluminum, titanium, tungsten, niobium, tantalum, and molybdenum, or ceramics containing metal oxides such as alumina and zirconia, nitrides such as silicon nitride, carbides such as titanium carbide, and borides such as chromium boride, or may be formed of a composite material, a coating material, and a bonding material obtained by combining the alloy and the ceramics. The screw 120 shown in FIG. 1 has spiral-shaped convey screw part 121 around an axis extending in the left-right direction of FIG. 1. By rotating this convey screw part 121 in contact with the processing target W10, the screw 120 conveys the processing target W10 from the upstream side to the downstream side in FIG. 1.

The shape of the convey screw part 121 shown in FIG. 1 is one example, and the shape of the convey screw part 121 is not limited to this. The shape of the convey screw part 121 may vary for different regions of the processing furnace 100. More specifically, for example, the pitch of the spiral of the convey screw part 121 may vary. The spiral shape of the convey screw part 121 may consist of not one but two threads. The convey screw part 121 may also have sections that are not spiral-shaped. The thickness and shape of a shaft part of the screw 120 may vary. As a result, the processing apparatus 10 can set the speed of movement and the behavior of objects inside the processing furnace 100 for each region. More specifically, for example, the processing apparatus 10 conveys, stirs, mixes, kneads, or grinds the objects in the processing furnace 100.

The screw 120 is pivotally supported at both ends of the processing furnace 100. The screw 120 shown in FIG. 1 connects to the drive apparatus 150 on the side of the supply port 101. The drive apparatus 150 has a predetermined rotation mechanism such as a motor to rotate the screw 120. The drive apparatus 150 may be configured to vary the rotational speed of the screw 120. In this case, the drive apparatus 150 may be a motor with an adjustable rotational speed or a combination of a motor with a constant rotational speed and a reduction gear with an adjustable reduction ratio.

The first decomposition region 130 is a region including a first recovery port 132 for recovering, from the processing furnace 100, a first fluid separated from the processing target W10 in a predetermined region in the intermediate part. The first decomposition region 130 is provided between the supply port 101 and the second decomposition region 140 in the processing furnace 100. The first recovery port 132 is a hole for taking out the first fluid F11 in the first decomposition region 130 to the outside of the processing furnace 100, i.e., a hole for recovering the first fluid F11. The first recovery port 132 connects to a first fluid recovery tube 133.

The first fluid recovery tube 133 connects to a first cooling apparatus 134. The first cooling apparatus 134 cools the first fluid F11 sent from the first fluid recovery tube 133 and changes it to a first cooling fluid F12. For example, when the first fluid F11 is sent as a gas, the first cooling apparatus 134 cools it to liquefy and recover it as the first cooling fluid F12 which is a liquid. In this way, the processing furnace 100 recovers the first fluid F11 obtained through decomposition in the first decomposition region 130 in a reusable manner. That is, the user of the processing furnace 100 can recover and reuse the first cooling fluid F12. The first fluid F11 may be a gas or a liquid.

The second decomposition region 140 is a region downstream of the first decomposition region 130 and includes a second recovery port 142 for recovering, from the processing furnace 100, a second fluid F21 different from the first fluid F11 and separated from the processing target W10. That is, the second decomposition region 140 may have a configuration equivalent to that of the first decomposition region 130 in a region different from the first decomposition region 130.

The second decomposition region 140 is provided between the first decomposition region 130 and the discharge port 102 in the intermediate part of the processing furnace 100. The second recovery port 142 is a hole for taking out the second fluid F21 in the second decomposition region 140 to the outside of the processing furnace 100, i.e., a hole for recovering the second fluid F21. The second recovery port 142 connects to a second fluid recovery tube 143.

The second fluid recovery tube 143 connects to a second cooling apparatus 144. The second cooling apparatus 144 cools the second fluid F21 sent from the second fluid recovery tube 143 and changes it to a second cooling fluid F22. For example, when the second fluid F21 is sent as a gas, the second cooling apparatus 144 cools it to liquefy and recover it as the second cooling fluid F22 which is a liquid. In this way, the processing furnace 100 recovers the second fluid F21 obtained through decomposition in the second decomposition region 140 in a reusable manner. That is, a user of the processing furnace 100 can recover and reuse the second cooling fluid F22. The second fluid F21 may be a gas or a liquid.

With the above configuration, the processing apparatus 10 can further decompose the processing target W10, which has passed through the first decomposition region 130, in the second decomposition region 140 to obtain the second fluid F21. Further, after the second fluid F21 is recovered from the second recovery port 142, the processing apparatus 10 conveys the remaining processing target W10 to the discharge port 102 and discharges the remaining processing target W10 as the residue W11. In FIG. 1, the first recovery port 132 and the second recovery port 142 are arranged on the upper part of the processing furnace 100, but the first recovery port 132 and the second recovery port 142 may be arranged on the side or lower part of the processing furnace 100. The first recovery port 132 and the second recovery port 142 may be arranged at different positions in the circumferential direction of the processing furnace 100.

Although the configuration of the processing apparatus 10 has been described above, the processing apparatus 10 according to the first embodiment is not limited to the configuration described above. For example, there may be two or more screws 120 as long as the number of the screws 120 is one or more. That is, the processing apparatus 10 may have a plurality of screws 120 arranged in parallel.

The cross-sectional shape in a plane orthogonal to the axis of the screw 120 of the processing furnace 100 may have a combination of lines defined as a curve of constant width (i.e. Reuleaux polygon). In this case, the cross-sectional shape of the convey screw part 121 of the screw 120 has a shape composed of a plurality of arcs corresponding to the curves of constant width (i.e. Reuleaux polygon). For example, when the cross-sectional shape inside the processing furnace 100 is circular, the cross-sectional shape of the screw 120 has a shape bounded by curves of constant width (i.e. Reuleaux polygon) composed of three arcs.

The processing furnace 100 is not limited to be oriented horizontally parallel, and instead may have a predetermined angle with respect to a horizontal plane, and the processing furnace 100 may have an inclined surface. The processing apparatus 10 may have the first decomposition region 130 and the second decomposition region 140 in the intermediate part, and may also have a configuration for recovering another fluid. In other words, the processing apparatus 10 may have three or more decomposition regions. The processing apparatus 10 described above is controlled by a control apparatus described later.

Figure 2:
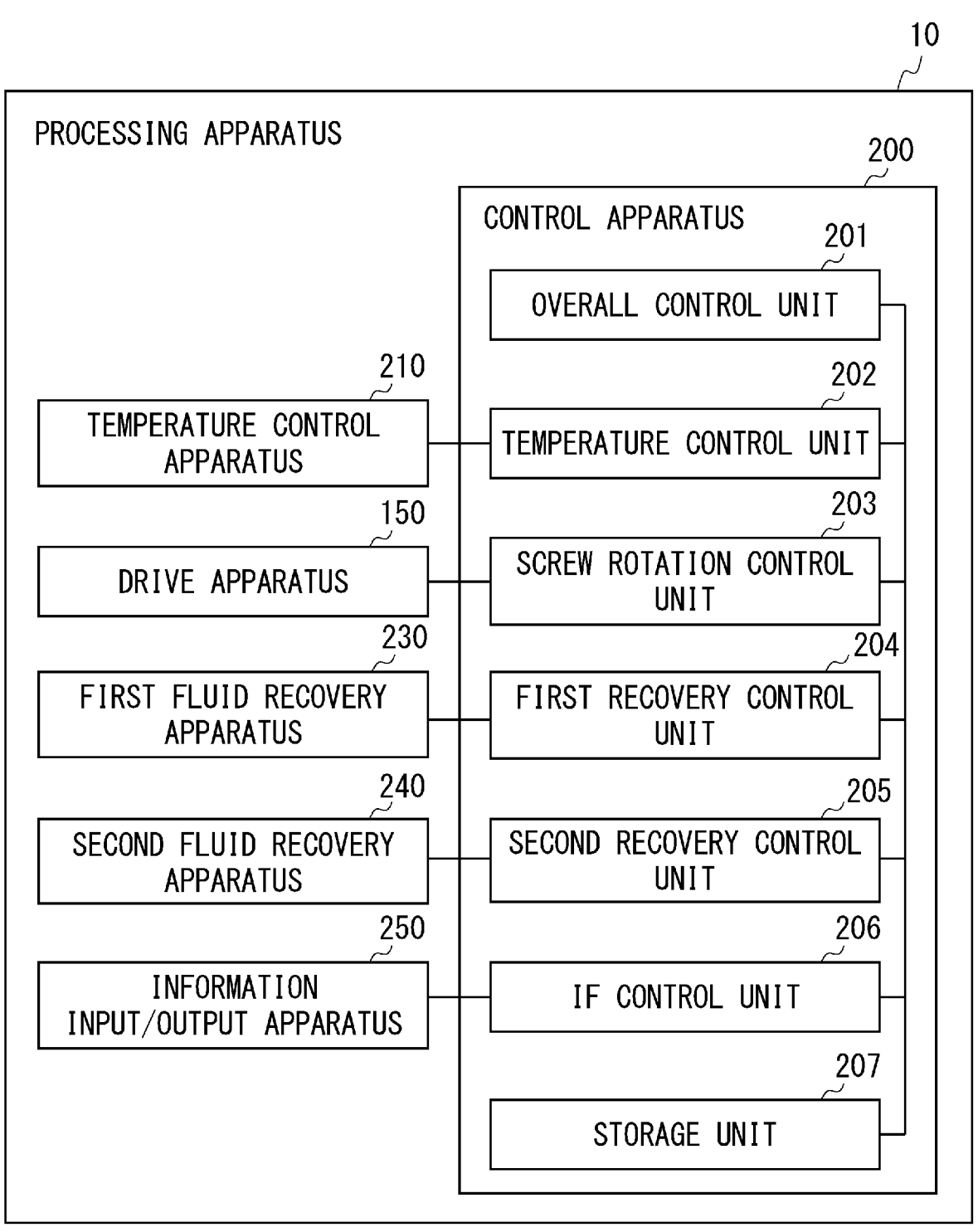
FIG. 2 is a block diagram of the processing apparatus according to the first embodiment.

Next, the function of the processing apparatus 10 will be described with reference to FIG. 2. FIG. 2 is a block diagram of the processing apparatus 10 according to the first embodiment. In addition to the configuration shown in FIG. 1, the processing apparatus 10 includes a control apparatus 200, a temperature control apparatus 210, a first fluid recovery apparatus 230, a second fluid recovery apparatus 240, and an information input/output apparatus 250.

The control apparatus 200 is a circuit board including an arithmetic unit such as a CPU (Central Processing Unit) or an MCU (Micro Controller Unit). The control apparatus 200 communicatively connects to the temperature control apparatus 210, the first fluid recovery apparatus 230, the second fluid recovery apparatus 240, and the information input/output apparatus 250, and controls their components. The control apparatus 200 achieves its functions by hardware and software mounted on a circuit board.

The control apparatus 200 has an overall control unit 201, a temperature control unit 202, a screw rotation control unit 203, a first recovery control unit 204, a second recovery control unit 205, an IF control unit 206, and a storage unit 207 as main functional components. These functional components of the control apparatus 200 may be integrated into a single unit or may be discrete components. These functional components of the control apparatus 200 may be achieved by a plurality of separate apparatuses working together.

The overall control unit 201 connects to each functional component of the control apparatus 200 and controls the overall operation of the functions. For example, the overall control unit 201 may perform an operation such as issuing an operation instruction to the screw rotation control unit 203 according to a state of a temperature supplied from the temperature control unit 202.

The temperature control unit 202 connects to the temperature control apparatus 210 to control the temperature of the processing furnace 100 in the temperature control region 110. The temperature control unit 202 has at least one of a heating apparatus and a cooling apparatus. The temperature control unit 202 may also have one or more thermometers for controlling the temperature.

The screw rotation control unit 203 connects to the drive apparatus 150 to control the operation of the drive apparatus 150. The screw rotation control unit 203 may, for example, have a motor drive circuit for driving a motor of the drive apparatus 150. The screw rotation control unit 203 may also have a rotation sensor for monitoring the rotational speed of the motor.

The first recovery control unit 204 controls a flow of the first fluid F11 in the first decomposition region 130. More specifically, the first recovery control unit 204 connects to the first fluid recovery apparatus 230 to control the operation of the first fluid recovery apparatus 230. The first fluid recovery apparatus 230 may include a valve, pump, flow meter, etc., for taking out the first fluid F11. The second recovery control unit 205 controls a flow of the second fluid F21 in the second decomposition region 140. More specifically, the second recovery control unit 205 connects to the second fluid recovery apparatus 240 to control the operation of the second fluid recovery apparatus 240. The second fluid recovery apparatus 240 may include a valve, pump, flow meter, etc., for taking out the second fluid F21.

The IF control unit 206 (IF=Interface) connects to the information input/output apparatus 250 and is an interface for exchanging information with a user through the information input/output apparatus 250. That is, the IF control unit 206 accepts an operation from the user through the information input/output apparatus 250, and supplies information related to the accepted operation to each component of the control apparatus 200 as appropriate. The IF control unit 206 controls a state of a display unit in the information input/output apparatus 250.

The storage unit 207 is a storage apparatus including a non-volatile memory such as a flash memory or a solid state drive (SSD). The storage unit 207 stores a program for the processing apparatus 10 to implement the functions in the present disclosure. The storage unit 207 also includes a volatile memory and temporarily stores predetermined information when the control apparatus 200 is operated. The information input/output apparatus 250 includes, for example, a button, a switch, or a touch panel for accepting an operation from the user. The information input/output apparatus 250 includes a display apparatus or the like for presenting information to the user.

The functional blocks of the processing apparatus 10 have been explained. The processing apparatus 10 conveys the accepted processing target W10 using the screw 120, controls the temperature of the processing furnace 100, and controls the atmosphere in the first decomposition region 130 and the second decomposition region 140.

Next, a method for processing the processing target W10 executed by the processing apparatus 10 will be described with reference to FIG. 3. FIG. 3 is a flowchart of processing executed by the processing apparatus 10. The flowchart shown in FIG. 3 starts by, for example, starting the supply of the processing target W10 to the processing apparatus 10.

First, the control apparatus 200 of the processing apparatus 10 controls the temperature by driving a heating apparatus or a cooling apparatus in the temperature control region 110 of the processing furnace 100 through the temperature control unit 202 (Step S11).

Next, the processing apparatus 10 receives the predetermined processing target W10 from the supply port 101 of the processing furnace 100 (Step S12).

Next, the control apparatus 200 of the processing apparatus 10 drives the drive apparatus 150 through the screw rotation control unit 203. Thus, the drive apparatus 150 rotates the screw 120. Then, the screw 120 conveys the received processing target W10 toward the discharge port 102 (Step S13).

Next, the processing apparatus 10 recovers, from the processing furnace 100, the first fluid F11 separated from the processing target W10 in the first decomposition region 130 provided in the intermediate part (Step S14).

Next, the processing apparatus 10 recovers the second fluid F21, which is a fluid different from the first fluid F11 and separated from the processing target W10, in the second decomposition region 140 positioned downstream of the first decomposition region 130 from the processing furnace 100 (Step S15).

Next, the processing apparatus 10 discharges the residue W11, which has passed through the second decomposition region 140, from the discharge port 102 (Step S16).

The processing method executed by the processing apparatus 10 has been described above. The above-described method is illustrated along the flow in which the processing apparatus 10 recovers the first fluid F11 and the second fluid F21 from the processing target W10, and discharges the residue W11 remaining in the processing furnace 100 after the first fluid F11 and the second fluid F21 are recovered. Once the processing described above is started, the processing apparatus 10 is sequentially supplied with the new processing targets W10, and each of the steps can be executed simultaneously in parallel. That is, the processing targets W10 can be continuously processed by the processing apparatus 10.

As described above, the processing apparatus 10 performs thermal decomposition, recovery of the first fluid F11 and the second fluid F21, which are valuable steam, and recovery of the residue (e.g., tar) among the steps included in chemical recycling in the pyrolysis method for thermally decomposing waste plastics.

The temperature control region 110 can control the temperature of the processing furnace 100 so that the temperature of the first decomposition region 130 differs from the temperature of the second decomposition region 140. Preferably, the temperature control region 110 controls the temperature of the processing furnace 100 so that the temperature of the second decomposition region 140 is higher than the temperature of the first decomposition region 130.

For example, the temperature control region 110 controls the temperature of the processing furnace 100 so that the first decomposition region 130 is about 500 degrees Celsius. As a result, the processing target W10 thermally decomposes in the first decomposition region 130 to produce the first fluid F11 which is a predetermined gas. The temperature control region 110 then controls the temperature of the processing furnace 100 so that the second decomposition region 140 is about 850 degrees Celsius. As a result, the processing target W10, after releasing the first fluid F11, further thermally decomposes in the second decomposition region 140 controlled at a temperature higher than that of the first decomposition region 130. This results in the production of the second fluid F21 different from the first fluid F11 as a predetermined gas.

The temperature control region 110 may also have a step of cooling the residue remaining after the second fluid F21 is recovered. More specifically, for example, the temperature control region 110 may cool the residue heated to about 850 degrees Celsius to about 40 degrees Celsius. In this way, the processing furnace 100 can safely discharge the cooled residue W11 from the discharge port 102.

Figure 4:
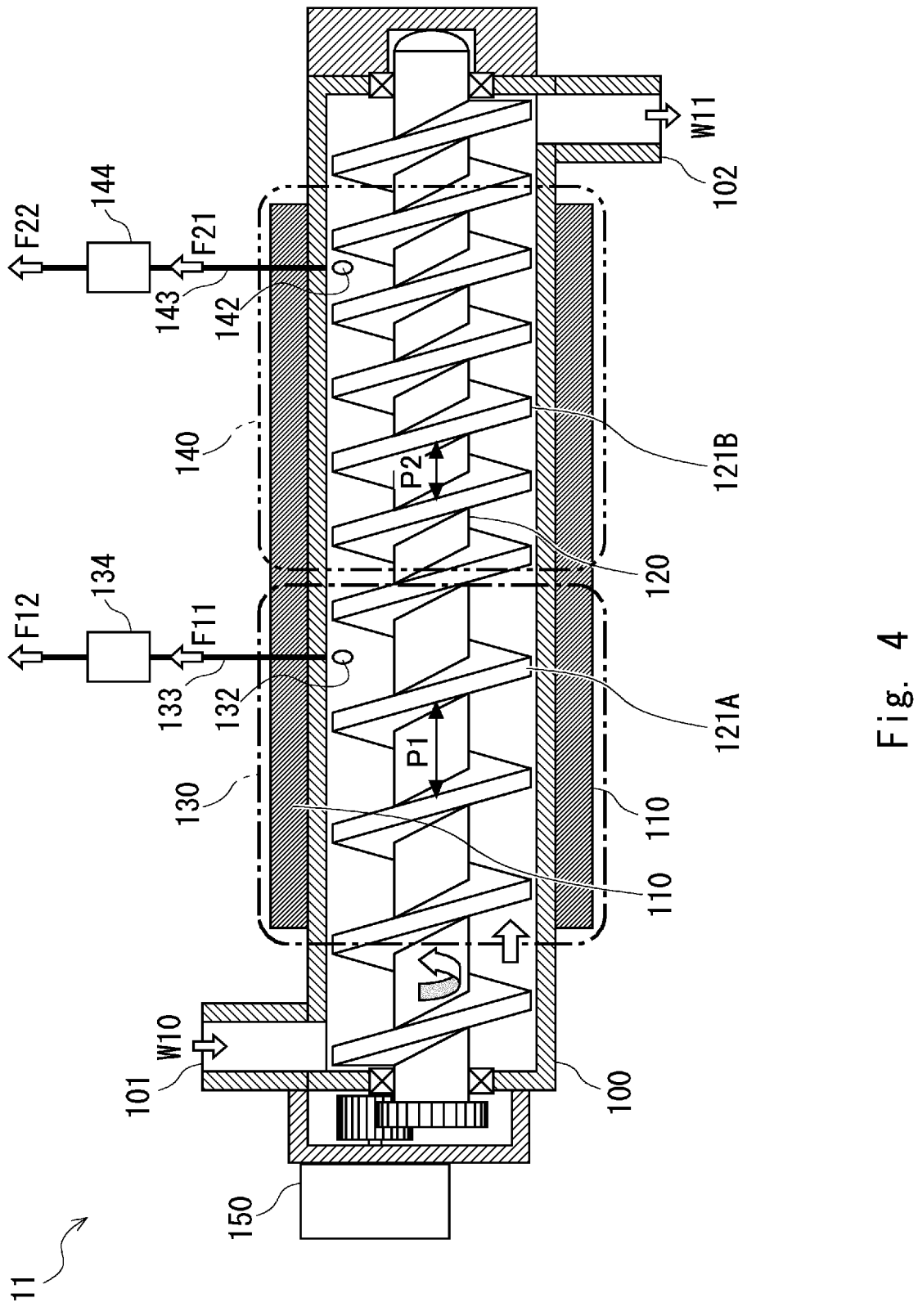
FIG. 4 is a side view showing a screw according to a first modified example.

Next, a variation of the structure of the screw 120 will be described with reference to FIG. 4. FIG. 4 is a side view showing a screw according to a first modified example. FIG. 4 shows a processing apparatus 11. The structure of the screw 120 of the processing apparatus 11 is different from that of the processing apparatus 10. The screw 120 has a structure in which the pitch of the convey screw part 121 for conveying the processing target W10 varies in the convey direction.

In the screw 120 shown in FIG. 4, the pitch (i.e., the screw pitch) of the convey screw part 121 in the first decomposition region 130 is a distance P1. In the screw 120, the screw pitch of the convey screw part 121 in the second decomposition region 140 is a distance P2 shorter than the distance P1. That is, the screw pitch of the screw 120 corresponding to the second decomposition region 140 is smaller than the screw pitch corresponding to the first decomposition region 130.

As described above, a first pitch of the convey screw part in a predetermined first conveyance region of the screw 120 can be set to be wider than a second pitch of the convey screw part in a second conveyance region downstream of the first conveyance region. The processing target W10 is thermally decomposed in the processing furnace 100, and the first fluid F11 and the second fluid F21 are recovered. That is, the volume of the processing target W10 decreases as it moves from the upstream to the downstream of the processing furnace 100. In other words, the processing target W10 is conveyed while undergoing volume reduction. Therefore, the processing apparatus 11 changes the pitch of the convey screw part 121 along the convey direction. Thus, the processing apparatus 10 can suppress the decrease in the conveyance efficiency due to the volume reduction. The pitch of the convey screw part 121 may gradually vary in a plurality of stages.

By changing the pitch of the convey screw part 121 as described above, the processing apparatus 11 can change the conveyance speed in a desired region. As a result, the processing apparatus 11 can perform processing efficiently.

Figure 5:
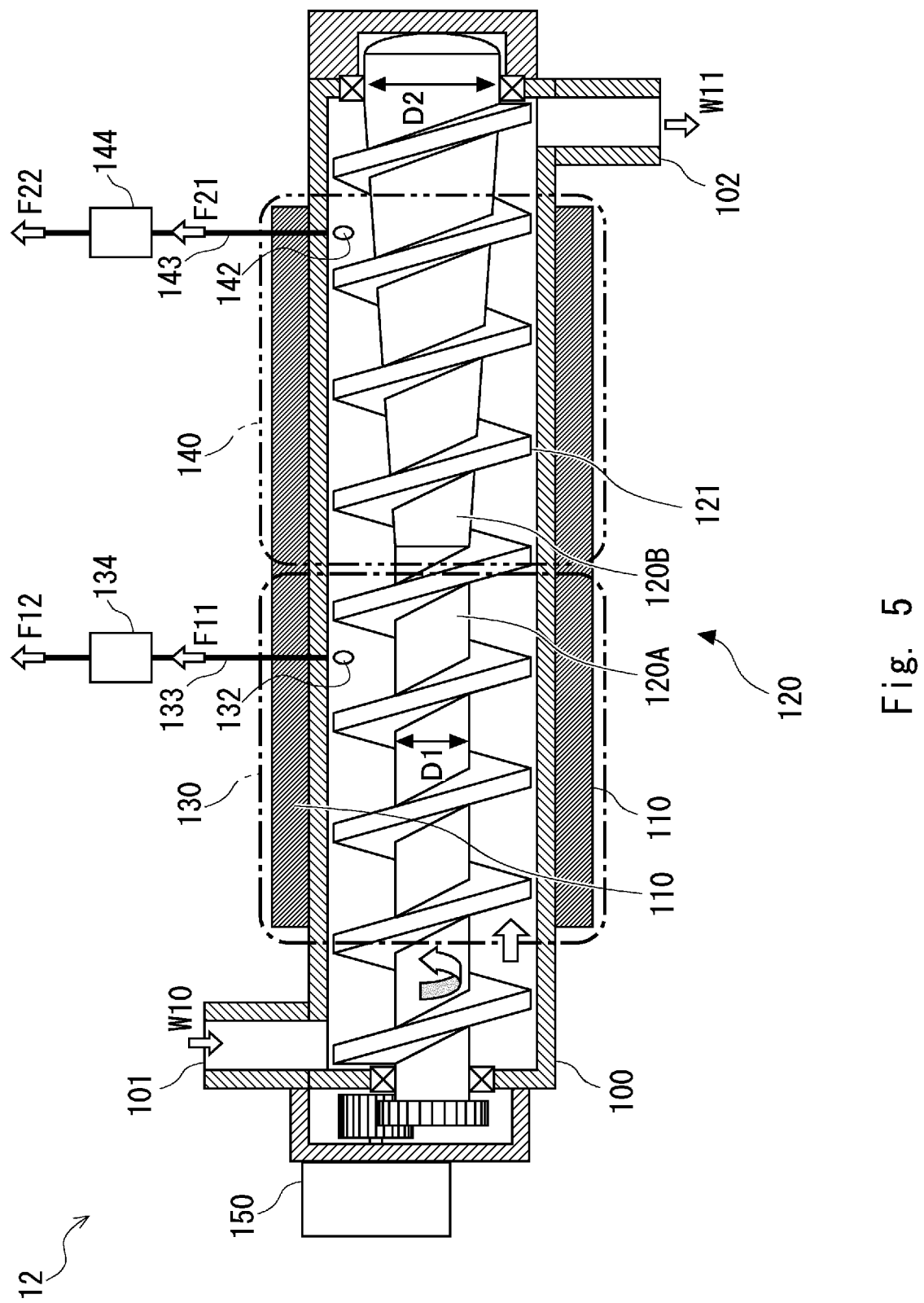
FIG. 5 is a side view showing a screw according to a second modified example.

Next, a further variation of the screw 120 will be described with reference to FIG. 5. FIG. 5 is a side view showing a screw according to a second modified example. FIG. 5 shows a processing apparatus 12. The structure of the screw 120 of the processing apparatus 12 is different from that of the processing apparatus 10. The screw 120 has a structure in which the diameter of the shaft part varies in the convey direction.

The screw 120 shown in FIG. 5 has a shaft part 120A extending from the supply port 101 to the first decomposition region 130. The diameter of the shaft part 120A is a constant value of a diameter D1. The screw 120 shown in FIG. 5 has a shaft part 120B on the downstream side of the shaft part 120A. The diameter of the shaft part 120B gradually increases from the diameter D1 upstream to downstream, and at the downstream end, the shaft part 120B has a diameter D2 greater than the diameter D1.

As described above, in the screw 120 of the processing apparatus 12, the first diameter of the shaft part in a predetermined third conveyance region is set to be smaller than the second diameter of the shaft part in a fourth conveyance region downstream of the third conveyance region. Thus, the processing apparatus 12 can suppress the decrease in the conveyance efficiency due to the volume reduction. Note that the shape of the shaft of the screw 120 is not limited to the one described above as long as the diameter of the shaft part in the intermediate part varies along the convey direction.

Figure 6:
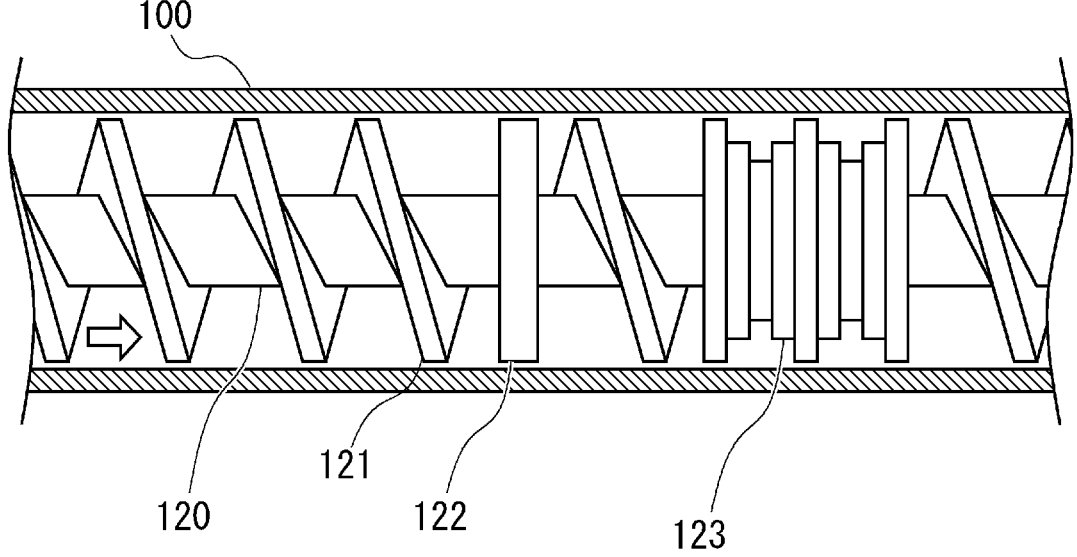
FIG. 6 is a side view showing a screw according to a third modified example.

Next, a further variation of the screw 120 will be described with reference to FIG. 6. FIG. 6 is a side view showing a screw according to a third modified example. FIG. 6 shows a part of the processing furnace 100 and the screw 120 cut out for clarity. The screw 120 is different from the screw 120 described above in that it has a retention part 122 and a stress part 123.

The retention part 122 is a plate-like member formed parallel to a plane orthogonal to the direction in which the axis of the screw 120 extends. As the retention part 122 is installed on the downstream side of the convey screw part 121, the conveyance of the processing target W10 is prevented and the processing target W is retained. The processing target W10 is retained on the upstream side of the retention part 122, and as a predetermined amount of the processing target W10 accumulates, the processing target W10 is pushed out by the processing target W10 accumulated on the upstream side and moves downstream.

The retention part 122 also retains the atmosphere on the upstream side of the retention part 122. In other words, the retention part 122 can restrict the flow of gas on the upstream side of the retention part 122. Thus, the retention part 122 can suppress the mixing of the atmosphere on the upstream side and the atmosphere on the downstream side. By suppressing the flow of the atmosphere in this way, the retention part 122 can suppress the decrease in the efficiency of thermal decomposition.

The stress part 123 has projections having surfaces or an arrangement forming an angle within the range of 0 degrees to 180 degrees with respect to the convey direction for the purpose of retaining, stirring, mixing, kneading, or grinding the processing target W10. To achieve the above purpose, the stress part 123 can employ various forms. In the stress part 123 shown in FIG. 6, nine plates of a rectangular shape having a surface forming an angle of 90 degrees with respect to the convey direction are arranged in a spiral configuration along the convey direction. With this structure, the stress part 123, for example, mixes or grinds the processing target W10 while conveying the processing target W10.

Figure 7:
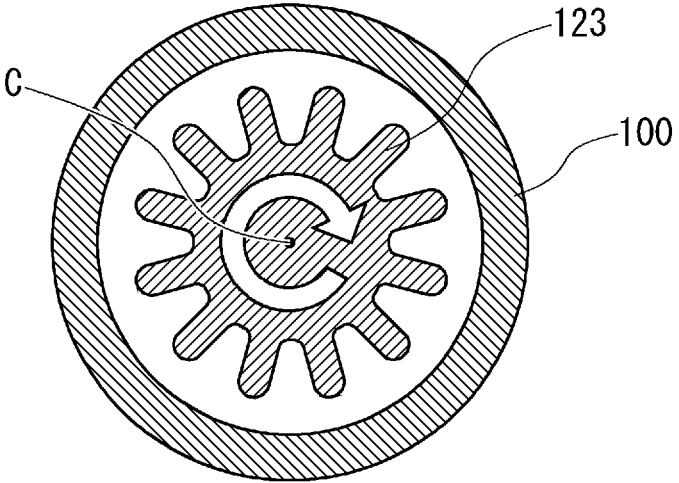
FIG. 7 is a cross-sectional view of a stress part of the screw according to the third modified example.

A further example of the stress part 123 will be described with reference to FIG. 7. FIG. 7 is a cross-sectional view of a stress part of the screw according to the third modified example. The cross-sectional view of in FIG. 7 shows a state in which the stress part 123 is observed from a direction orthogonal to the axis of the screw 120.

FIG. 7 shows a cross section of the stress part 123 of the screw 120 disposed inside the processing furnace 100. The stress part 123 shown in FIG. 7 has a plurality of projection and recesses alternately formed radially from a center C of the axis of the screw 120. The stress part 123 rotates clockwise with the center C as a rotation axis. As a result, the stress part 123 stirs the processing target W10 present around the stress part 123.

As described above, the variations of the screw 120 have been described. The variations of the screw 120 described above are just some examples that the screw 120 could have. The forms of the screw 120 in the processing apparatus described above are not limited to those described above.

The first embodiment has been described above. The processing apparatus according to the first embodiment is not limited to the above-described configuration. For example, the processing apparatus 10 may have a forced transport mechanism at the first fluid recovery tube 133 in the first decomposition region 130. The forced transport mechanism is a mechanism for increasing the flow rate of the first fluid F11 flowing through the first fluid recovery tube 133 via the first recovery port 132. The forced transport mechanism is, for example, a pump including a motor. In this case, the pump of the forced transport mechanism drives the motor to suck the fluid, thereby increasing the flow rate of the first fluid F11. Similarly, the processing apparatus 10 may have a forced transport mechanism at the second recovery port 142 in the second decomposition region 140. Note that the forced transport mechanism is not limited to the above-described configuration as long as it is a mechanism capable of forcibly discharging a fluid at the first recovery port 132 or the second recovery port 142.

In the processing apparatus 10 described above, the processing apparatus 10 has two decomposition regions (first decomposition region 130 and second decomposition region 140), and instead the processing apparatus 10 may have three or more decomposition regions. The processing apparatus 10 may also have a plurality of temperature control regions 110 along the axial direction of the screw 120. The processing apparatus 10 also controls the temperature of the processing furnace 100 and performs thermal decomposition along the axial direction of the screw 120 at the intermediate part. Furthermore, the processing apparatus 10 can convey objects inside the processing furnace 100 and provide physical stimulation such as stirring and kneading. The processing apparatus 10 can simultaneously and accurately perform the atmosphere control, temperature control, and physical control described above. That is, the processing apparatus 10 can consolidate and take on some of a plurality of processing steps and a group of apparatuses in a system of chemical recycling processing. Therefore, according to the first embodiment, it is possible to provide a processing apparatus and so on for efficiently decomposing waste plastics.

Second Embodiment

Figure 8:
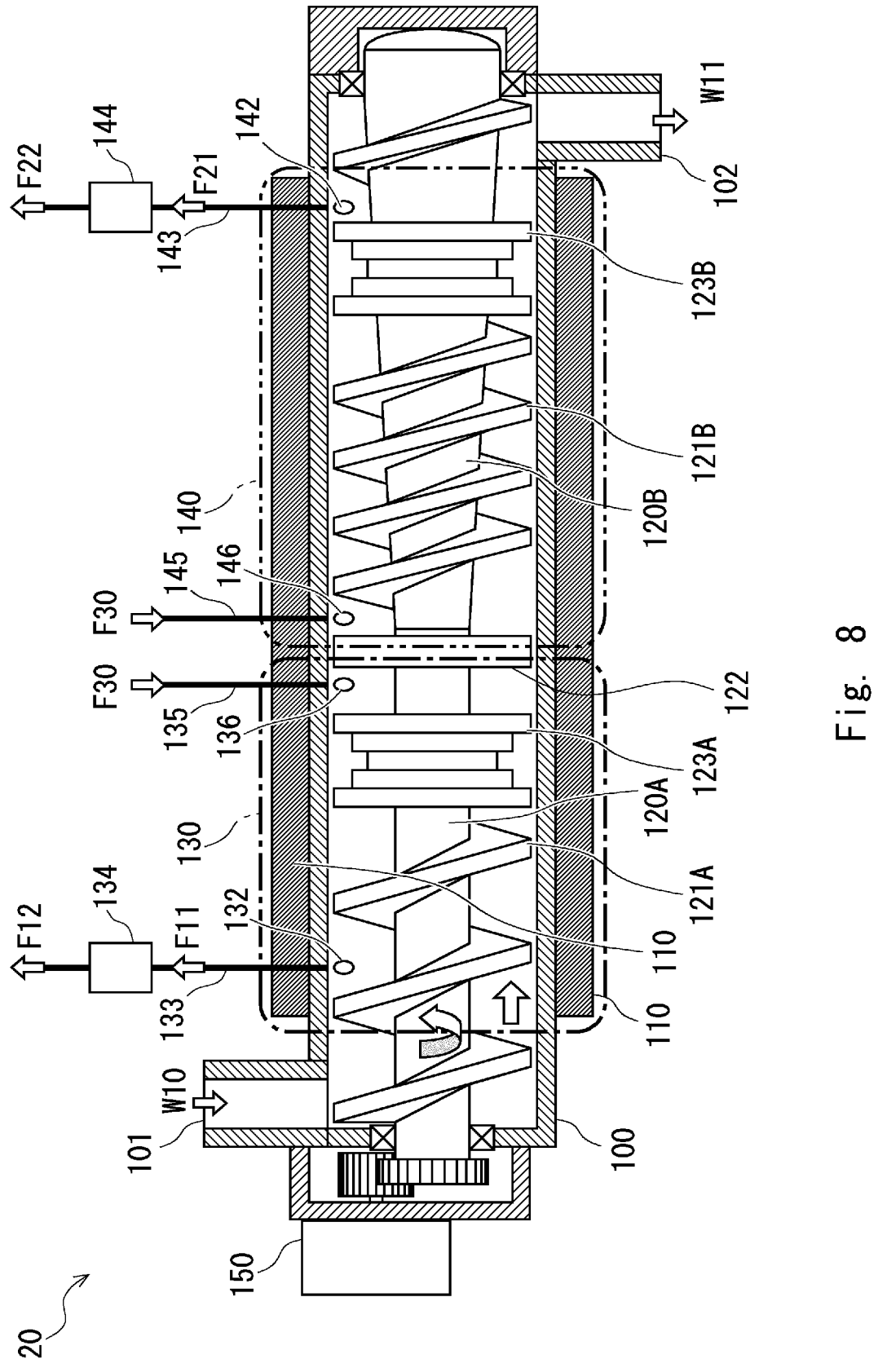
FIG. 8 is a side view of a processing apparatus according to a second embodiment.

Next, a second embodiment will be described. The second embodiment differs from the first embodiment in that a predetermined fluid is supplied to the intermediate part in addition to the above-described configuration. FIG. 8 is a side view of the processing apparatus 20 according to the second embodiment. In the processing apparatus 20, the processing furnace 100 further includes a fluid supply port 136 and a fluid supply port 146 for supplying a third fluid different from the first fluid or the second fluid into the processing furnace at the intermediate part. Also, the structure of the screw 120 in the processing apparatus 20 according to the second embodiment differs from that in the processing apparatus according to the first embodiment.

The processing apparatus 20 shown in FIG. 8 has the fluid supply port 136 in the first decomposition region 130. The fluid supply port 136 is a delivery hole for receiving the supply of a third fluid F30 from a third fluid supply tube 135 and delivering the third fluid F30 to the processing furnace 100. In the processing apparatus 20, the first recovery port 132 is provided on the upstream side of the first decomposition region 130. The fluid supply port 136 is provided on the downstream side of the first decomposition region 130.

The number and arrangement of the fluid supply port 136 and the first recovery port 132 are not limited to those in the above-described configuration. There may be one each of the first recovery port 132 and the fluid supply port 136, or there may be two or more of either or both of the first recovery port 132 and the fluid supply port 136. The first recovery port 132 and the fluid supply port 136 may be arranged at predetermined positions in the circumferential direction of the processing furnace 100. For example, when the top position in the radial cross section of the processing furnace 100 is set at 0 o'clock, the fluid supply port 136 and the first recovery port 132 may be arranged at 0 o'clock or at any position from 0 o'clock to 12 o'clock. Further, the first recovery port 132 may be provided on the downstream side of the first decomposition region 130, and the fluid supply port 136 may be provided on the upstream side of the first decomposition region 130. For example, the first recovery port 132 and the fluid supply port 136 may be alternately arranged along the axial direction of the screw 120.

As long as the third fluid F30 has fluidity, its form and composition are not particularly restricted. That is, the third fluid F30 may be a solid, a liquid, a gas or a supercritical fluid, but preferably a gas. The third fluid F30 may be, for example, an inert gas such as nitrogen, a reducing gas such as carbon monoxide, a gas having an extraction capability such as water, or a mixture of these gases. The third fluid F30 may have different components from those of the first fluid F11 and the second fluid F21. The third fluid F30 may contain the same components as those of the first fluid F11 and the second fluid F21. The processing apparatus 20 receives the third fluid F30 from the fluid supply port 136, thereby facilitating the flow of the first fluid F11 generated in the processing furnace 100 to the first recovery port 132. Alternatively, the processing apparatus 20 receives the third fluid F30 from the fluid supply port 136, thereby facilitating the selective recovery of a specific component among a plurality of gases generated in the first decomposition region 130.

The processing apparatus 20 also has the fluid supply port 146 in the second decomposition region 140. The fluid supply port 146 is a delivery hole for receiving the supply of the third fluid F30 from a third fluid supply tube 145 and delivering the third fluid F30 to the processing furnace 100. In the processing apparatus 20, the second recovery port 142 is provided on the downstream side of the second decomposition region 140. The fluid supply port 146 is provided on the upstream side of the second decomposition region 140.

The number and arrangement of the fluid supply port 146 and the second recovery port 142 are not limited to the above-described configuration. There may be one each of the second recovery port 142 and the fluid supply port 146, or there may be two or more of either or both of the second recovery port 142 and the fluid supply port 146. The second recovery port 142 and the fluid supply port 146 may be arranged at predetermined positions in the circumferential direction of the processing furnace 100. For example, when the top position in the radial cross section of the processing furnace 100 is set at 0 o'clock, the fluid supply port 146 and the second recovery port 142 may be arranged at 0 o'clock or at any position from 0 o'clock to 12 o'clock. Further, the second recovery port 142 may be provided on the downstream side of the second decomposition region 140, and the fluid supply port 146 may be provided on the upstream side of the second decomposition region 140. For example, the second recovery port 142 and the fluid supply port 146 may be alternately arranged along the axial direction of the screw 120.

The processing apparatus 20 receives the third fluid F30 from the fluid supply port 146, thereby facilitating the flow of the second fluid F21 generated in the processing furnace 100 to the second recovery port 142. Alternatively, the processing apparatus 20 receives the third fluid F30 from the fluid supply port 146, thereby facilitating the selective recovery of a specific component among a plurality of gases generated in the second decomposition region 140.

As described above, the processing furnace 100 has the fluid supply port 136 and the fluid supply port 146 between the first recovery port 132 and the second recovery port 142. That is, the processing apparatus 20 receives the third fluid F30 in a boundary region between the first decomposition region 130 and the second decomposition region 140. Thus, the processing apparatus 20 suppresses the mixing of the first fluid F11 generated in the first decomposition region 130 and the second fluid F21 generated in the second decomposition region 140. In addition, each of the fluid supply port 136, the fluid supply port 146, the first recovery port 132, and the second recovery port 142 may have a separation part such as a filter or a retention space for separating the processing target W10 from the third fluid F30.

In the processing apparatus 20 shown in FIG. 8, the screw 120 has a different configuration between the first decomposition region 130 and the second decomposition region 140. That is, the screw 120 has the shaft part 120A, a convey screw part 121A, and a stress part 123A in the first decomposition region 130. The screw 120 also has the shaft part 120B, a convey screw part 121B, and a stress part 123B in the second decomposition region 140. Further, the screw 120 has the retention part 122 at a boundary part between the first decomposition region 130 and the second decomposition region 140.

The shaft part 120A in the first decomposition region 130 has a constant thickness. On the other hand, the diameter of the shaft part 120B in the second decomposition region 140 increases toward the downstream side. The convey screw part 121A in the first decomposition region 130 has a wider pitch than the convey screw part 121B in the second decomposition region 140. With this configuration, the processing apparatus 20 suppresses the decrease in the conveyance efficiency of the processing target W10, which undergoes volume reduction in the processing furnace 100.

In the processing apparatus 20, the screw 120 has a stress part 123A on the upstream side of the fluid supply port 136 between the convey screw part 121A and the fluid supply port. That is, the screw 120 has projections on the upstream side of the fluid supply port 136 having surfaces or an arrangement forming an angle in the range of 0 degrees to 180 degrees with respect to the convey direction for the purpose of retaining, stirring, mixing, kneading, or grinding the processing target W10. Thus, the processing apparatus 20 can apply a predetermined stress to the processing target W10, which has been heated to a desired temperature in the first decomposition region 130. In this way, the processing apparatus 20 guides the first fluid F11 generated in the stress part 123A to the first recovery port 132.

In the processing apparatus 20, the screw 120 has a stress part 123B on the upstream side of the second recovery port

142 between the convey screw part 121B and the second recovery port 142. That is, the screw 120 has, between the fluid supply port 146 and the second recovery port 142, projections having surfaces or an arrangement forming an angle in the range of 0 degrees to 180 degrees with respect to the convey direction for the purpose of retaining, stirring, mixing, kneading, or grinding the processing target W10. Thus, the processing apparatus 20 can apply a predetermined stress to the processing target W10, which has been heated to a desired temperature in the second decomposition region 140. In this way, the processing apparatus 20 guides the second fluid F21 generated in the stress part 123B to the second recovery port 142.

Further, the screw 120 has the retention part 122 between the first decomposition region 130 and the second decomposition region 140, thereby improving the separability of the atmosphere in the first decomposition region 130 and the atmosphere in the second decomposition region 140. The temperature control region 110 controls the temperature of the processing furnace 100 so that the temperature of the second decomposition region 140 is higher than the temperature of the first decomposition region 130. With this configuration, the processing apparatus 20 can suitably take out the first fluid F11 from the first recovery port 132 and the second fluid F21 from the second recovery port 142. Each of the first fluid F11 and the second fluid F21 can include the third fluid F30. However, a substance that can be easily separated in a later step is selected as the third fluid F30. The means of separation may be, for example, a filter that selectively adsorbs either the first fluid F11, the second fluid F21, or the third fluid F30 in accordance with the components of the first fluid F11, the second fluid F21, and the third fluid F30. Alternatively, the means of separation may be means for selectively liquefying either the first fluid F11, the second fluid F21, or the third fluid F30 via the first cooling apparatus 134 or the second cooling apparatus 144. However, the means of separation is not limited to the means described above.

In the above-described configuration, the components of the fluid supplied from the fluid supply port 136 and the components of the fluid supplied from the fluid supply port 146 may be different. The configurations of the fluid supply port 136 and the fluid supply port 146 are not limited to those described above.

A processing method according to this embodiment will be described with reference to FIG. 9. FIG. 9 is a flowchart of a processing method implemented by the processing apparatus 20 according to the second embodiment. In the flowchart shown in FIG. 9, steps prior to Step S12 are different from those in the flowchart according to the first embodiment.

First, the processing apparatus 20 controls the temperature of the processing furnace 100 so that the temperature of the second decomposition region 140 is higher than the temperature of the first decomposition region 130 (Step S21). For example, the processing apparatus 20 sets the temperature of the first decomposition region 130 to about 500 degrees and sets the temperature of the second decomposition region 140 to about 850 degrees.

Next, the processing furnace 100 of the processing apparatus 20 receives the third fluid F30 from the fluid supply port 136 and the fluid supply port 146 further provided between the first recovery port 132 provided in the first decomposition region 130 and the second recovery port 142 provided in the second decomposition region 140 (Step S22).

The following steps are the same as those according to the first embodiment. By performing such processing, the processing apparatus 20 can provide processing steps for efficiently decomposing waste plastics.

The second embodiment has been described above. In the processing apparatus 20 according to the second embodiment, the screw 120 can employ various configurations to implement the above functions. The processing apparatus 20 can set the temperature of the temperature control region 110 to various desired temperatures. As described so far, according to the second embodiment, it is possible to provide a processing apparatus for efficiently decomposing waste plastics.

Third Embodiment

Figure 10:
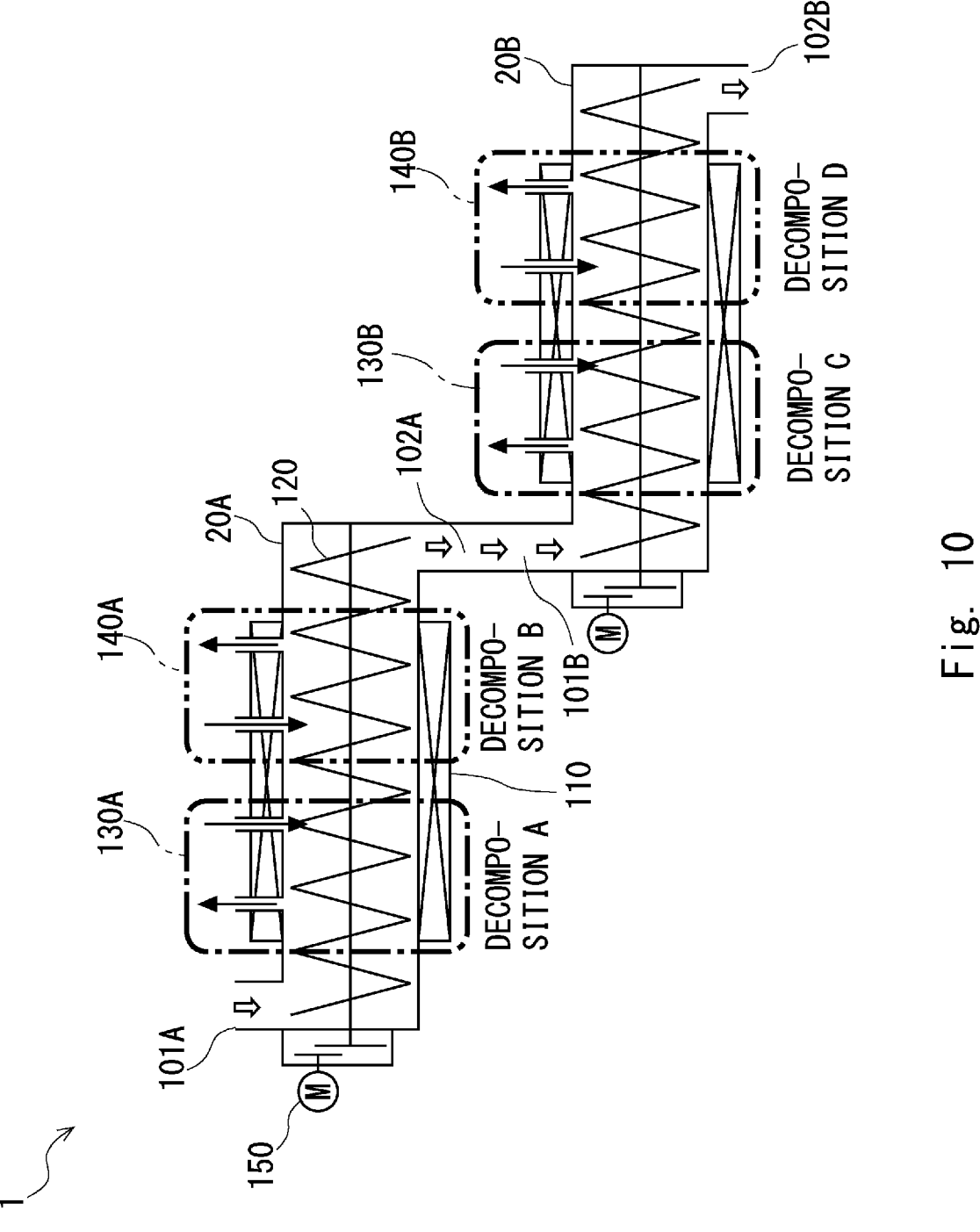
FIG. 10 is a configuration diagram of a processing system according to a third embodiment.

Next, a third embodiment will be described. FIG. 10 is a configuration diagram of a processing system according to the third embodiment. The processing system 1 shown in FIG. 10 is a system in which two processing apparatuses 20, namely, a first processing apparatus 20A and a second processing apparatus 20B, are coupled in series. FIG. 10 schematically shows a state in which the first processing apparatus 20A and the second processing apparatus 20B are coupled.

The first processing apparatus 20A shown in FIG. 10 has a first decomposition region 130A and a second decomposition region 140A. The first processing apparatus 20A receives a processing target from a supply port 101A and performs decomposition processing A in the first decomposition region 130A. The first processing apparatus 20A performs decomposition processing B in the second decomposition region 140A. The first processing apparatus 20A discharges an intermediate object, which has been subjected to the decomposition B, from a discharge port 102A.

The second processing apparatus 20B receives the intermediate object from the supply port 101B. The second processing apparatus 20B has a third decomposition region 130B and a fourth decomposition region 140B. The second processing apparatus 20B performs decomposition processing C in the third decomposition region 130B. The second processing apparatus 20B performs decomposition processing D in the fourth decomposition region 140B. The second processing apparatus 20B then discharges a residue from the discharge port 102B.

The third embodiment has been described above. One or both of the above-described processing apparatuses 10 may of course be the processing apparatus 20. In addition, the processing system according to the third embodiment may be composed of three or more processing apparatuses 10 coupled to one another. With such a configuration, the processing system 1 according to the third embodiment can continuously execute a plurality of decomposition processing. In addition, with such a configuration, the processing system 1 according to the third embodiment enables a flexible arrangement of the system itself and a flexible system configuration. That is, according to the third embodiment, it is possible to provide a processing system that efficiently executes desired recycling processing requiring a plurality of steps.

Fourth Embodiment

Figure 11:
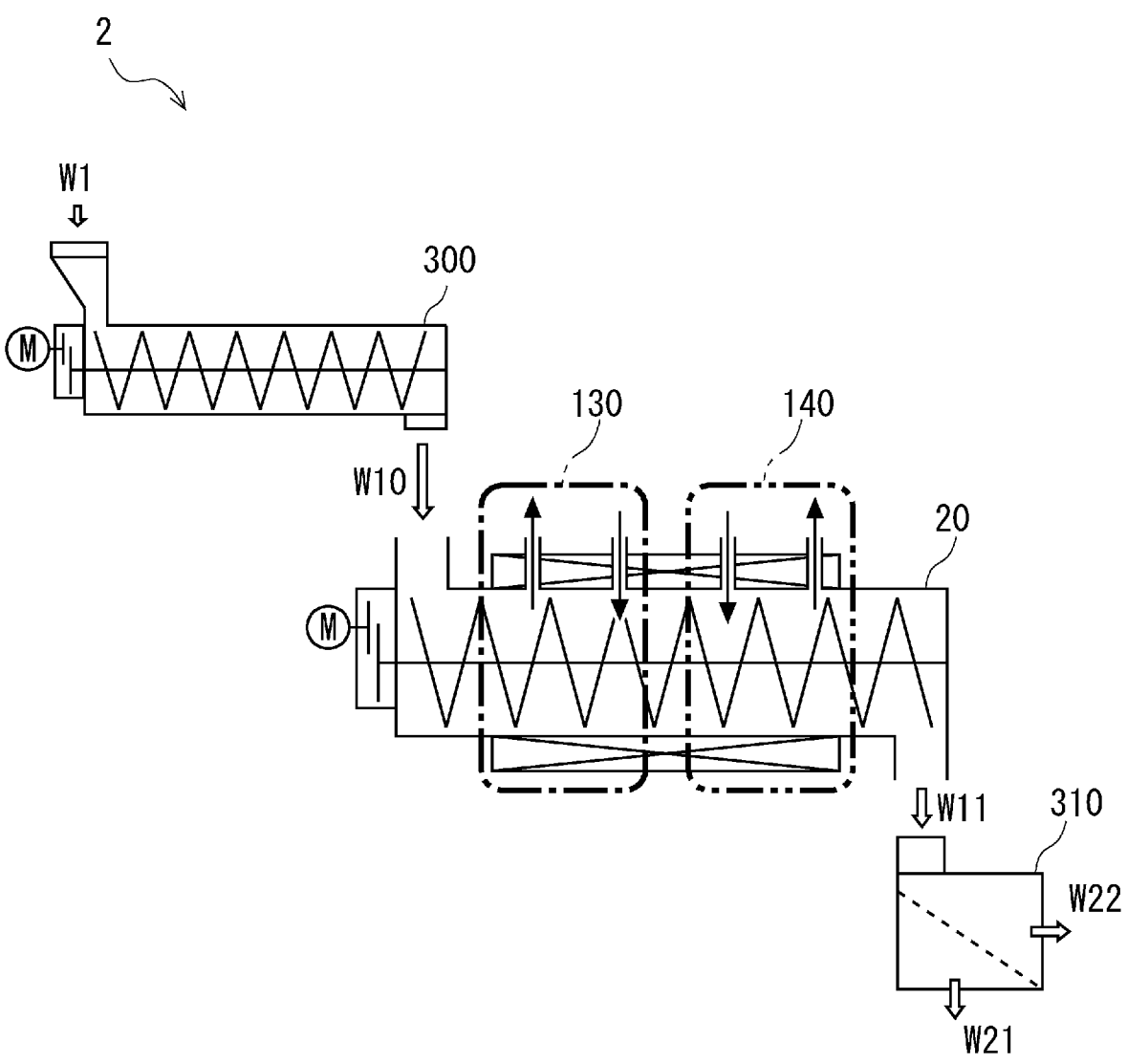
FIG. 11 is a configuration diagram of a processing system according to a fourth embodiment.

Next, a fourth embodiment will be described with reference to FIG. 11. FIG. 11 is a configuration diagram of a processing system according to a fourth embodiment. FIG. 11 shows a configuration of a processing system 2 according to the fourth embodiment. The processing system 2 includes an extruder 300, a processing apparatus 20, and a separation apparatus 310.

When the extruder 300 receives a waste plastic W1, the extruder 300 extrudes the waste plastic W1 while heating it to generate a processing target W10. The processing apparatus 20 receives the processing target W10 generated by the extruder 300 and performs predetermined decomposition processing. By performing the decomposition processing, the processing apparatus 20 recovers a first fluid F11 and a second fluid F21 and discharges a residue W11.

Upon receiving the residue W11 discharged from the processing apparatus 20, the separation apparatus 310 filters it through a filter and separates it into a first residue W21 such as metal powder and a second residue W22 such as tar.

The fourth embodiment has been described above. According to fourth embodiment, it is possible to provide a processing system for efficiently decomposing waste plastics.

Fifth Embodiment

Figure 12:
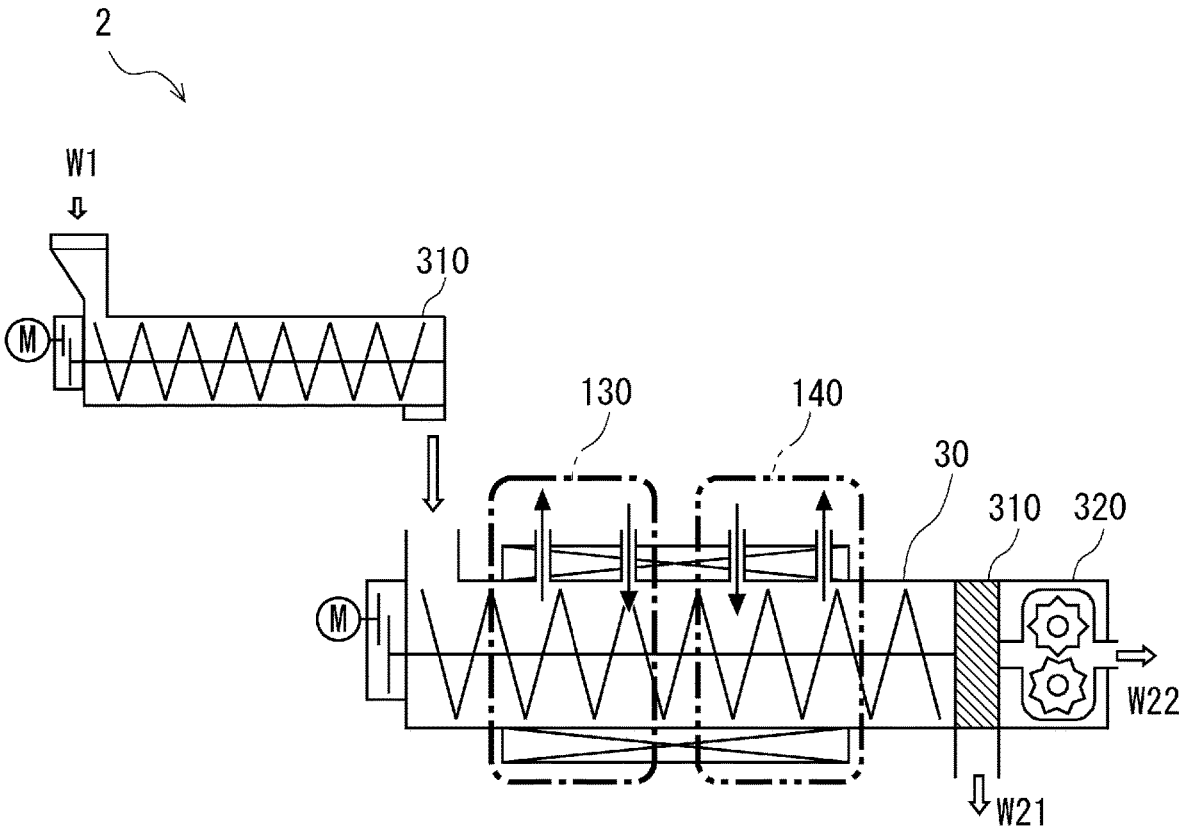
FIG. 12 is a configuration diagram of a processing system according to a fifth embodiment.

Next, a fifth embodiment will be described with reference to FIG. 12. FIG. 12 is a configuration diagram of a processing system according to the fifth embodiment. The processing system according to the fifth embodiment differs from the processing system according to the fourth embodiment in that the processing apparatus according to the fifth embodiment further includes a separation apparatus and a pump. FIG. 12 shows a processing system 3. The processing system 3 includes an extruder 300 and a processing apparatus 30.

The processing apparatus 30 includes a separation apparatus 310 and a pump 320 in the latter stage of the processing apparatus 20. Therefore, the processing apparatus 30 supplies a processing target, which has been subjected to decomposition processing in the second decomposition region 140, to the separation apparatus 310. By filtering the processing target, the separation apparatus 310 separates it into a first residue W21 containing metal powder and the like and a second residue W22 containing oils and fats. The separation apparatus 310 discharges the first residue W21 from the processing apparatus 30 and supplies the second residue W22 to the pump 320.

The pump 320 is a gear pump, for example, and forcibly discharges the received second residue W22 to the outside of the processing apparatus 30. At this time, the pump 320 forcibly discharges the residue while controlling the pressure inside the processing furnace 100. Thus, the processing apparatus 30 can suitably execute the processing in the processing furnace 100.

As described above, according to the sixth embodiment, it is possible to provide a processing system for efficiently decomposing waste plastics.

It should be noted that the present disclosure is not limited to the above embodiments and can be suitably modified to the extent that it does not deviate from the purpose.

This application is based upon and claims the benefit of priority from Japanese patent application No. 2021-157968, filed on Sep. 28, 2021, the disclosure of which is incorporated herein in its entirety by reference.

INDUSTRIAL APPLICABILITY

The present disclosure can be used, for example, as an apparatus for carrying out chemical recycling for decomposing waste plastics.

REFERENCE SIGNS LIST 1, 2, 3 PROCESSING SYSTEM
10, 11, 12, 20, 30 PROCESSING APPARATUS
100 PROCESSING FURNACE
101 SUPPLY PORT
102 DISCHARGE PORT
110 TEMPERATURE CONTROL REGION
120 SCREW
120A SHAFT PART
120B SHAFT PART
121 CONVEY SCREW PART
122 RETENTION PART
123 STRESS PART
130 FIRST DECOMPOSITION REGION
132 FIRST RECOVERY PORT
133 FIRST FLUID RECOVERY TUBE
134 FIRST COOLING APPARATUS
135 THIRD FLUID SUPPLY TUBE
136 FLUID SUPPLY PORT
140 SECOND DECOMPOSITION REGION
141 SECOND FLUID INLET
142 SECOND RECOVERY PORT
143 SECOND FLUID RECOVERY TUBE
144 SECOND COOLING APPARATUS
145 THIRD FLUID SUPPLY TUBE
146 FLUID SUPPLY PORT
150 DRIVE APPARATUS
200 CONTROL APPARATUS
201 OVERALL CONTROL UNIT
202 TEMPERATURE CONTROL UNIT
203 SCREW ROTATION CONTROL UNIT
204 FIRST RECOVERY CONTROL UNIT
205 SECOND RECOVERY CONTROL UNIT
206 IF CONTROL UNIT
207 STORAGE UNIT
210 TEMPERATURE CONTROL APPARATUS
230 FIRST FLUID RECOVERY APPARATUS
240 SECOND FLUID RECOVERY APPARATUS
250 INFORMATION INPUT/OUTPUT APPARATUS
300 EXTRUDER
310 SEPARATION APPARATUS
320 PUMP
F11 FIRST FLUID
F21 SECOND FLUID
F30 THIRD FLUID
W10 PROCESSING TARGET
W11 RESIDUE

The invention claimed is:

1. A processing apparatus comprising:
a cylindrical processing furnace including a supply port configured to receive a processing target on an upstream side and a discharge port configured to discharge a residue on a downstream side;
a temperature control region including a heater or a cooler configured to control a temperature of the processing furnace at a predetermined position in an intermediate part between the supply port and the discharge port;
a screw extending from the upstream side of the processing furnace to the downstream side thereof configured to be able to convey the processing target supplied from the supply port toward the discharge port by rotating;
a first decomposition region including a first recovery port configured to take out a first fluid separated from the processing target in a predetermined region in the intermediate part to outside of the processing furnace; and a second decomposition region including a second recovery port configured to take out a second fluid separated from the processing target to the outside of the processing furnace, the second decomposition region being positioned on the downstream side of the first decomposition region, and the second fluid being different from the first fluid,
wherein the screw has a structure in which a pitch of a convey screw part for conveying the processing target varies in a convey direction, and a diameter of a shaft part of the screw varies along the convey direction, and
wherein the processing furnace further comprises a fluid supply port configured to supply, into the processing furnace, a third fluid including the same components as or different components from those of the first fluid or the second fluid in the intermediate part.

2. The processing apparatus according to claim 1, wherein the temperature control region controls the temperature of the processing furnace so that a temperature of the second decomposition region is higher than the temperature of the first decomposition region.

3. The processing apparatus according to claim 1, further comprising a drive apparatus configured to vary a rotational speed of the screw.

4. The processing apparatus according to claim 1, wherein, in the screw, a first pitch of the convey screw part in a predetermined first conveyance region is set to be wider than a second pitch of the convey screw part in a second conveyance region on the downstream side of the first conveyance region.

5. The processing apparatus according to claim 1, wherein, in the screw, a first diameter of the shaft part in a predetermined third conveyance region is set to be smaller than a second diameter of the shaft part in a fourth conveyance region on the downstream side of the third conveyance region.

6. The processing apparatus according to claim 1, wherein the screw includes a projection having a surface or arrangement forming an angle in a range of 0 degrees to 180 degrees with respect to the convey direction for the purpose of retaining, stirring, mixing, kneading, or grinding the processing target.

7. The processing apparatus according to claim 1, further comprising a plurality of the screws arranged in parallel inside the processing furnace.

8. The processing apparatus according to claim 1, wherein the processing furnace has the fluid supply port between the first recovery port and the second recovery port.

9. The processing apparatus according to claim 8, wherein the screw includes, on the upstream side of the fluid supply port, a projection having a surface or arrangement forming an angle in a range of 0 degrees to 180 degrees with respect to the convey direction for the purpose of retaining, stirring, mixing, kneading, or grinding the processing target.

10. The processing apparatus according to claim 1, further comprising a pump at a later stage of the discharge port configured to forcibly discharge the residue while controlling an internal pressure of the processing furnace.

11. A processing method comprising:
receiving a processing target to a cylindrical processing furnace including a supply port configured to receive the processing target on an upstream side and a discharge port configured to discharge a residue on a downstream side;
conveying the processing target toward the discharge port by a screw extending from the upstream side of the processing furnace to the downstream side thereof, the screw having a structure in which a pitch of a convey screw part for conveying the processing target varies in a convey direction, and a diameter of a shaft part of the screw varies along the convey direction;

controlling a temperature of the processing furnace at a predetermined position in an intermediate part between the supply port and the discharge port;

recovering, from the processing furnace, a first fluid separated from the processing target in a first decomposition region provided in the intermediate part;

recovering, from the processing furnace, a second fluid separated from the processing target in a second decomposition region, the second decomposition region being positioned on the downstream side of the first decomposition region, and the second fluid being different from the first fluid;

discharging the residue passed through the second decomposition region from the discharge port, wherein the processing furnace receives a third fluid from a fluid supply port further provided between the first recovery port provided in the first decomposition region and the second recovery port provided in the second decomposition region, the third fluid including the same components as or different components from those of the first fluid or the second fluid.

12. The processing method according to claim 11, wherein the temperature of the processing furnace is controlled so that a temperature of the second decomposition region is higher than the temperature of the first decomposition region.

\* \* \* \* \*